J. J. ADAMSEN.
VEHICLE WHEEL.
APPLICATION FILED SEPT. 2, 1916.
1,239,658.
Patented Sept. 11, 1917.
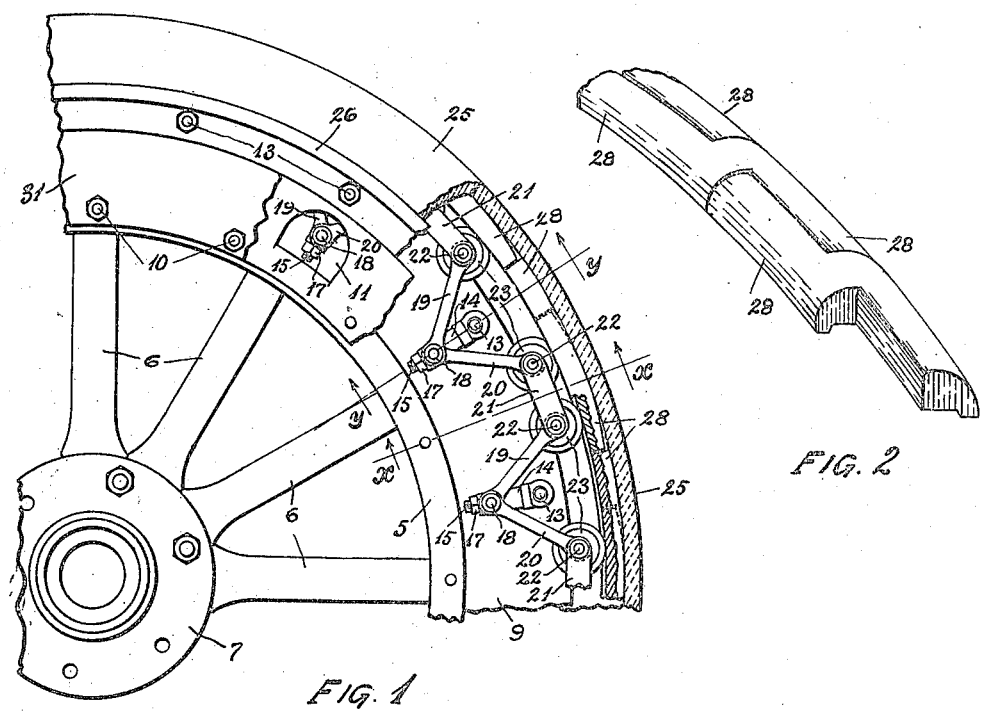
FIG. 1
FIG. 2
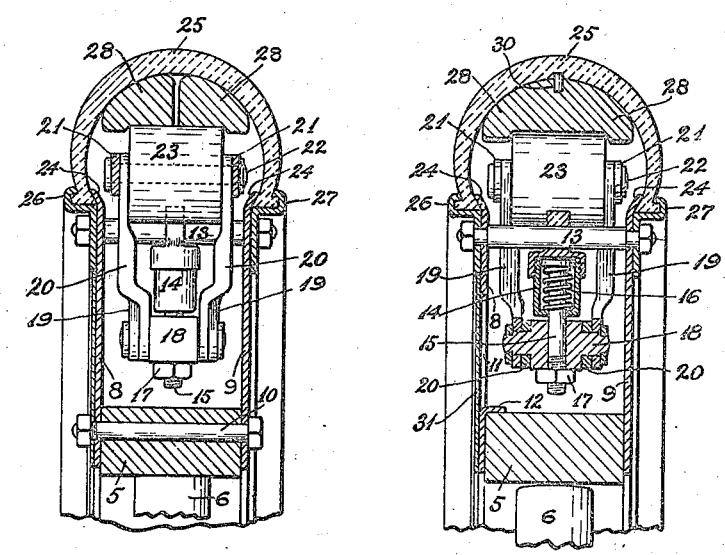
WITNESS
O. Johnson
FIG. 3
FIG. 4
INVENTOR
James J. Adamsen
BY
C. D. Haskins
ATTORNEY

UNITED STATES PATENT OFFICE.

JAMES J. ADAMSEN, OF SEATTLE, WASHINGTON.

VEHICLE-WHEEL.

1,239,658.  Specification of Letters Patent.  Patented Sept. 11, 1917.

Application filed September 2, 1916. Serial No. 118,238.

*To all whom it may concern:*

Be it known that I, JAMES J. ADAMSEN, a citizen of the United States, residing at Seattle, in the county of King and State of Washington, have invented a certain new and useful Improvement in Vehicle-Wheels, of which the following is a specification.

My invention relates to improvements in vehicle wheels, and the object of my invention is to provide a vehicle wheel which shall be simple in its plan of construction, reliable and durable under all conditions of use, and whose tread portion shall be supported by springs and associated devices in such manner that its yielding and resilient quality will adapt it advantageously to take the place of a wheel that is provided with a pneumatic tire.

I accomplish this object by devices illustrated in the accompanying drawings wherein Figure 1 is a fragmentary view in side elevation of a wheel embodying my invention, showing portions of some parts broken away to disclose other parts thereof; Fig. 2 is a perspective view of details of the same; Fig. 3 is a view of the same in transverse section on broken line $x$, $x$ of Fig. 1; and Fig. 4 is a view of the same in transverse section on broken line $y$, $y$ of said Fig. 1.

Referring to the drawings, throughout which like reference numerals indicate like parts, 5 designates the felly of an automobile wheel mounted on spokes 6 which project radially from a hub 7.

Secured to each of the opposite sides of the felly 5 is an annular metal plate of a larger diameter than said felly 5, as plates 8 and 9, which plates 8 and 9 are fastened in a position concentric with the felly 5 by means of bolts 10, the plate 8 being provided with a plurality of equi-distantly disposed holes 11, one of which is shown in Fig. 1 and another of which is shown in cross-section in Fig. 4.

Adjacent to the periphery of the felly 5, a portion of the metal displaced in the operation of forming each of the holes 11 in the plate 8 is bent inwardly to a right angle to form a lug 12 which engages with said periphery of said felly 5, as more clearly shown in Fig. 4, which lugs 12 serve to aid the bolts 10 in maintaining the plate in its concentric position with respect to the felly 5.

A plurality of stay-bolts 13, each of which is of the form shown more clearly in Fig. 4, are disposed at equi-distant points adjacent to the outer circular edges of the plates 8 and 9 to extend through and between said plates 8 and 9.

To the central portion of each of the bolts 13 is articulated one end of a tubular spring-box 14 through the bottom of which extends the screw-threaded shank of a suspension rod 15 which is provided with a head on its inner end, and surrounding said rod 15 is a helical compression spring 16 one end of which engages with the under side of the head of said rod 15 while its other end engages with the bottom of the spring-box 14 (as more clearly shown in Fig. 4), whereby the head of the rod 15 has pressure exerted upon it that tends to force the rod 15 in a direction toward the cover of said box 14, thus to elastically suspend said rod 15 from the bolt 13.

Upon the screw-threaded end portion of each of the rods 15 is an adjusting nut 17 and on said rod 15 between said nut 17 and the spring-box 14 is transversely disposed a swivel pivot-rod 18 and upon each of the opposite ends of each pivot-rod 18 one end of each of two links 19 and 20 is articulated.

The links 19 and 20 on each end of each of the pivot-rods 18 are disposed to extend in diverging lines away from the periphery of the felly 5 to a point beyond the peripheries of the plates 8 and 9 where the end of each of the links 19 of each pivot-rod 18 is articulated to one end of a connecting link (as connecting links 21) whose other end is articulated to the end of the adjacent link 20 of the adjacent pivot-rod 18, thus the links 19 and 20 of adjacent pivot-rods 18 are connected by a connecting link 21, as shown in Fig. 1, there being a pivot shaft (as pivot shafts 22) disposed to extend through and between the opposite links 19 of each pivot-rod 18 and through the oppositely disposed connecting links 21, and there being also a pivot shaft 22 disposed to extend through and between the oppositely disposed links 20 of each pivot-rod 18 and through said oppositely disposed connecting links 21.

Rotatably mounted on each of the pivot shafts 22 is a roller, as rollers 23, which rollers 23 preferably consist of a rigid core surrounded by elastic material, as soft vulcanized rubber.

The outer circular edge portions 24 of the annular plates 8 and 9 are each bent to flare outwardly to adapt them to engage with the inner surfaces of the edge portions of a rubber tire 25 which in cross-section is semi-circular in shape and which is secured in its position to surround the wheel by means of annular clamping rings 26 and 27 which respectively engage the outer surfaces and edges of the opposite edge portions of said rubber tire 25, as more clearly shown in Figs. 3 and 4, said clamping rings 26 and 27 being secured by the bolts 13.

Obviously, the felly 5 and the flanges formed thereon by the annular plates 8 and 9 might be constructed of metal to be integral with each other.

Disposed within the rubber tire 25 are a plurality of separate segments, as segments 28, of the form and arrangement shown by perspective view in Fig. 2, to form a ring whose periphery engages with the inner surface of the tread portion of the tire 25 while its inner circular side engages with and is supported by the several rollers 23, as shown.

In order to maintain said ring in a constant position with respect to the rubber tire 25, one or more of the segments 28 of said ring may be provided with a dowel pin, as dowel pin 30, which projects into the rubber tire 25 as shown in Fig. 4. Of course, screws or other forms of fastening devices may be employed in place of the dowel pins 30.

The holes 11 through the annular plate 8 are disposed each opposite a different one of the suspension rods 15 in order to make the adjusting nuts 17 accessible in the operation of adjusting said nuts 17; and said holes 11 are normally covered by a removable annular metal plate 31 which is fastened in its place by the nuts of the bolts 10.

In the operation of the structure shown and described, the nuts 17 are adjusted to set the helical springs 16 at desired degrees of compression that will dispose the suspension rods 15 to support the rollers 23 in positions that will cause the ring formed by the segments 28 to be normally concentric with the felly 5, whereby, when the wheel travels over the surface of a roadway, the helical springs 16 will yield to compensate for any roughness or unevenness of such roadway like a wheel supplied with a pneumatic tire.

The segments 28 may be made of any suitable material as molded vulcanized soft rubber or they may be made of wood or felt.

Preferably the tire 25 is made of vulcanized soft rubber, but obviously, it may be made of other flexible material, as woven fabric combined with vulcanized soft rubber, and while I have shown only one form of means for yieldingly supporting the suspension rods 15 it is obvious that other well known resilient devices may be employed.

Manifestly, changes may be made in the forms, dimensions and arrangement of parts of my invention without departing from the spirit thereof.

What I claim is:

1. In a resilient vehicle wheel of the class described, the combination with the felly of a wheel, of two annular plates secured one to each of opposite sides of said felly in a position concentric therewith, the external diameter of said two plates being greater than the diameter of said felly; a plurality of stay-bolts disposed to extend through and between said plates at points near the peripheries thereof; a suspension rod yieldingly attached to each of said stay-bolts; a transversely disposed swivel pivot-rod adjustably mounted on each of said suspension rods; two links articulated to each of the opposite end portions of each of said swivel pivot-rods to extend in diverging lines to points beyond said stay-bolts; pivot-shafts disposed to extend between and unite the outer ends of the oppositely disposed ones of said diverging links; a roller rotatably mounted on each of said pivot shafts; links disposed to extend between and connect adjacent diverging links of adjacent swivel pivot-rods; a rubber tire of curved cross-section secured to the outer circular edges of said annular plates in a position to adapt it to inclose said rollers; and a ring made of separable segments disposed to engage its interior surface with and to surround all of said rollers and to engage its exterior surface with the inner surface of said tire.

2. A resilient vehicle wheel of the class described, which embodies a felly provided with a flange concentrically disposed on each of its opposite sides to extend beyond its periphery to form a channel therearound; a plurality of rollers transversely disposed within said channel each at a different point; a yielding supporting means for said rollers upon which they are rotatable; a ring made of independently movable segments disposed to engage its interior surface with and to surround all of said rollers; and a flexible tire of curved cross-section secured to the outer edges of said flanges in a position to inclose, and engage its inner surface with all of said segments.

3. In a resilient wheel, a felly, a ring surrounding the same and comprising a plurality of independently movable segments, flanges carried by said felly, rollers bearing against the inner face of said ring and unconnected thereto, means carrying said rollers and supported by said flanges for yieldingly projecting said rollers against the inner face of said ring, and an inclosing tire secured to said flanges.

4. In a resilient wheel, a felly, a ring surrounding the same and comprising a plurality of relatively movable segments, flanges carried by said felly, a series of transverse members supported by said flanges, rollers bearing against the inner face of said ring, and means supported by said transverse members and carrying said rollers for yieldingly projecting said rollers against the inner face of said ring.

5. In a resilient wheel, a felly, a ring surrounding the same and comprising a plurality of relatively movable segments, flanges carried by said felly, a series of transverse members supported by said flanges, rollers bearing against the inner face of said ring, suspension rods yieldingly attached to said transverse members, and diverging links connecting a pair of rollers to each suspension rod.

In witness whereof, I hereunto subscribe my name this 24th day of August, A. D. 1916.

JAMES J. ADAMSEN.

Witnesses:
FRANK WARREN,
WILLIAM B. CARR.

Copies of this patent may be obtained for five cents each, by addressing the "Commissioner of Patents, Washington, D. C."